United States Patent
Bolzmacher et al.

(10) Patent No.: US 9,285,841 B2
(45) Date of Patent: Mar. 15, 2016

(54) DISPLAY DEVICE HAVING A DEFORMABLE SURFACE AND POSITION SENSORS

(75) Inventors: Christian Bolzmacher, Montrouge (FR); Fabien Ferlay, Taulignan (FR); Moustapha Hafez, Arcueil (FR); Florian Periquet, Laxou (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 79 days.

(21) Appl. No.: 14/119,289

(22) PCT Filed: May 24, 2012

(86) PCT No.: PCT/FR2012/051168
§ 371 (c)(1),
(2), (4) Date: Nov. 21, 2013

(87) PCT Pub. No.: WO2012/164207
PCT Pub. Date: Dec. 6, 2012

(65) Prior Publication Data
US 2014/0184947 A1    Jul. 3, 2014

(30) Foreign Application Priority Data
May 30, 2011  (FR) ..................... 11 54722

(51) Int. Cl.
| | | |
|---|---|---|
| *G06F 1/16* | (2006.01) | |
| *G06F 3/01* | (2006.01) | |
| *G09B 21/00* | (2006.01) | |
| *G06F 3/041* | (2006.01) | |
| *G06F 3/0481* | (2013.01) | |

(52) U.S. Cl.
CPC .............. *G06F 1/1692* (2013.01); *G06F 3/016* (2013.01); *G06F 3/041* (2013.01); *G06F 3/04812* (2013.01); *G09B 21/003* (2013.01); *G09B 21/004* (2013.01); *G06F 2203/04102* (2013.01)

(58) Field of Classification Search
CPC ..... G06F 3/016; G06F 3/0412; G06F 3/0414; G06F 3/044; G06F 3/045; G02F 1/3338
USPC ................... 345/60, 156, 173–174, 214, 104; 715/702, 703; 349/12
See application file for complete search history.

(56) References Cited

U.S. PATENT DOCUMENTS

| | | | |
|---|---|---|---|
| 2004/0056877 | A1 | 3/2004 | Nakajima |
| 2006/0238510 | A1 | 10/2006 | Panotopoulos et al. |

(Continued)

FOREIGN PATENT DOCUMENTS

| | | |
|---|---|---|
| EP | 1 717 667 | 11/2006 |
| GB | 2 463 012 | 3/2010 |
| WO | 2005 015376 | 2/2005 |

OTHER PUBLICATIONS

International Search Report Issued Sep. 25, 2012 in PCT/FR12/051168 Filed May 24, 2012.

*Primary Examiner* — Ricardo L Osorio
(74) *Attorney, Agent, or Firm* — Oblon, McClelland, Maier & Neustadt, L.L.P.

(57) ABSTRACT

A display device including a deformable surface, including: plural actuators including mobile elements that can be moved to deform the deformable surface, the mobile elements being distributed in a space occupied by the deformable surface; a set of position sensors for sensing the position of at least one touch, and distributed in the space occupied by the deformable surface; and an elastic flexible membrane placed against the mobile elements, extending through the space occupied by the deformable surface and configured to accompany deformation of the deformable surface. The set of sensors is secured to the elastic flexible membrane and distributed in a regular manner in the space occupied by the deformable surface in an array of electricity conductors configured to accompany deformations of the elastic flexible membrane.

12 Claims, 3 Drawing Sheets

(56) References Cited

U.S. PATENT DOCUMENTS

Figure 4:
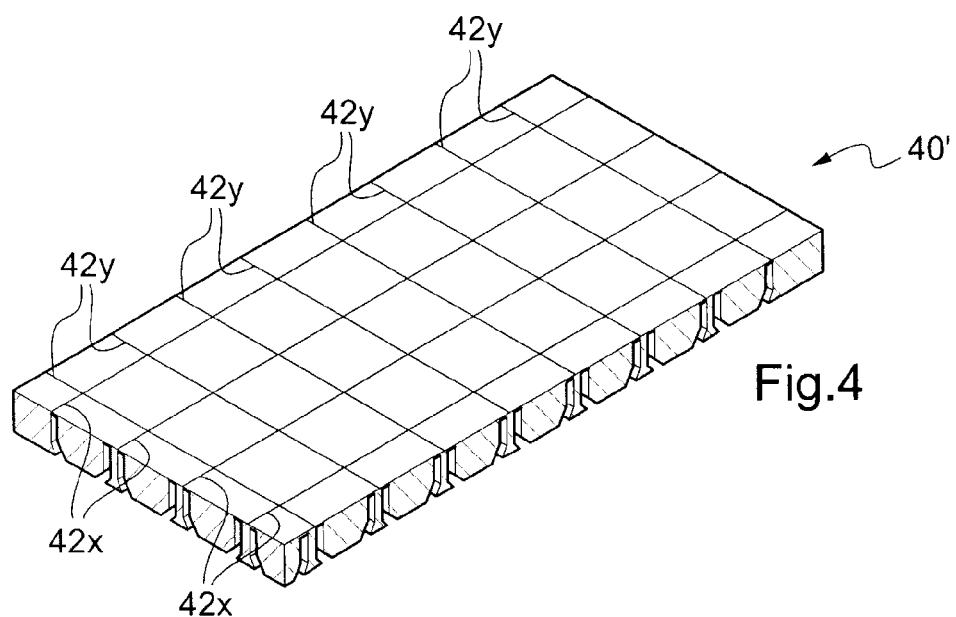

| | | | |
|---|---|---|---|
| 2010/0033196 A1* | 2/2010 | Hayakawa et al. | 324/686 |
| 2010/0162109 A1* | 6/2010 | Chatterjee et al. | 715/702 |
| 2011/0001613 A1* | 1/2011 | Ciesla et al. | 340/407.2 |
| 2012/0242607 A1* | 9/2012 | Ciesla et al. | 345/173 |
| 2012/0299905 A1* | 11/2012 | Roselier et al. | 345/214 |

* cited by examiner

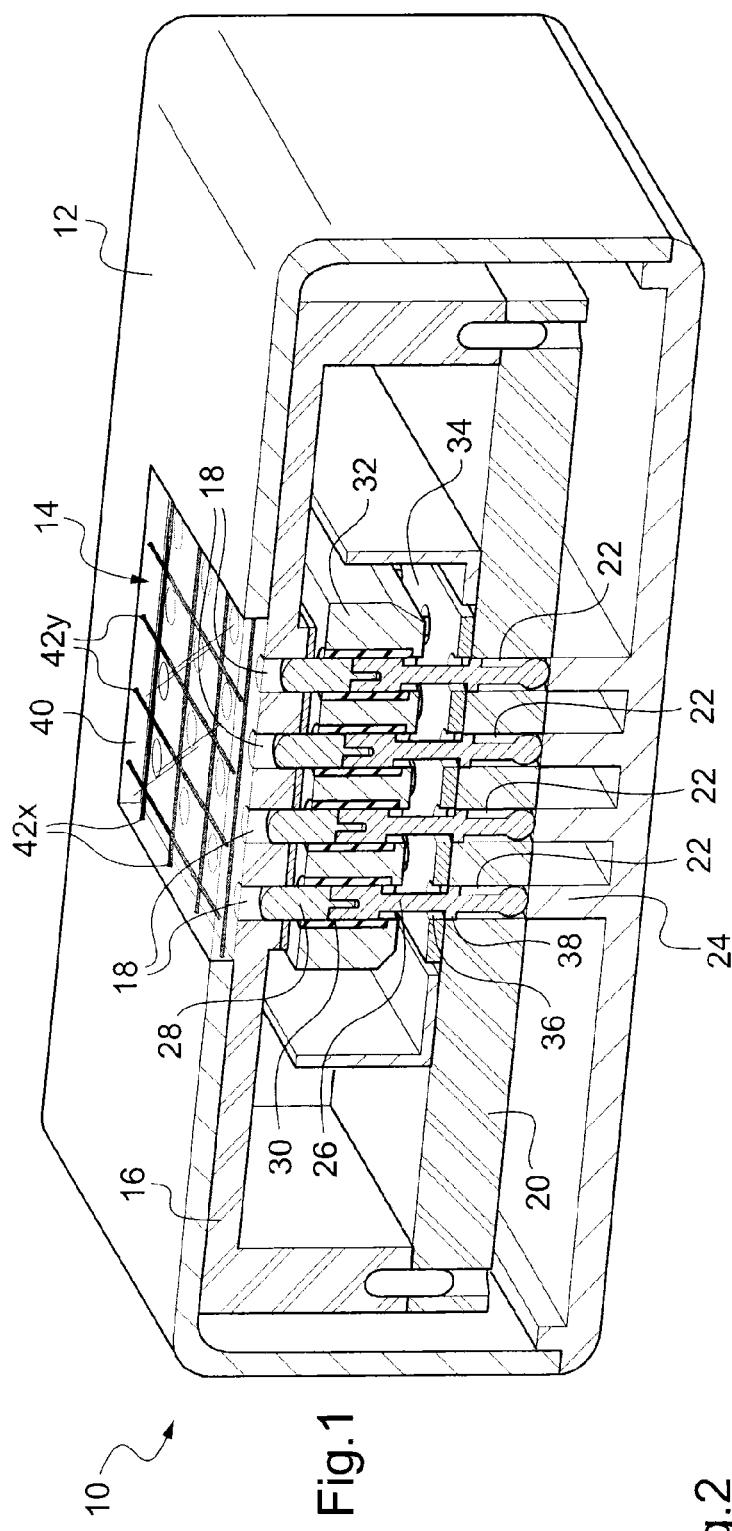
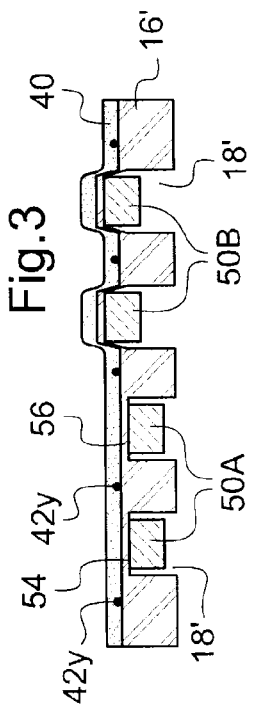
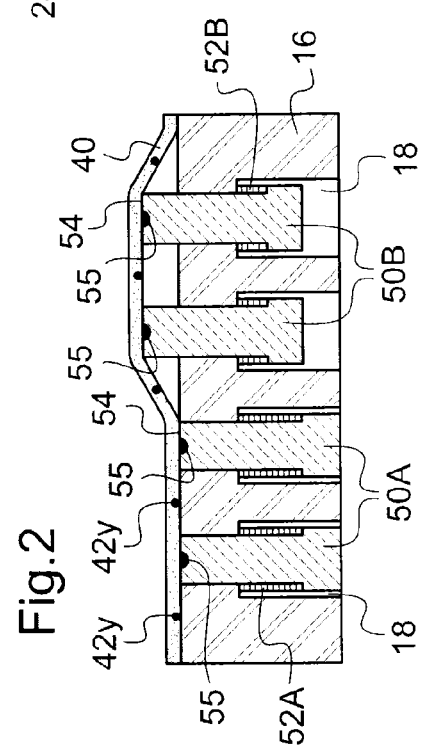

DISPLAY DEVICE HAVING A DEFORMABLE SURFACE AND POSITION SENSORS

This invention relates to a display device having a deformable surface and having position sensors for sensing the position of at least one touch. This type of display device is both tactile thanks to its deformable display surface and interactive since it is provided to react to a touch.

More precisely, the invention relates to a device of the type comprising:
- a plurality of actuators having mobile elements that can be moved so as to deform the deformable surface, these mobile elements being distributed in the space occupied by the deformable surface, and
- a set of position sensors for sensing the position of at least one touch likewise being distributed in the space occupied by the deformable surface.

Such a device is for example described in the patent published under number U.S. Pat. No. 5,717,423. More precisely, this device provides a direct fastening of the sensors on the actuators. The sensors take in particular the form of caps with capacitive detection that cover the mobile elements of the actuators. This configuration has a risk of electrical interaction between the actuators and the sensors. It further has the disadvantage of a risk of dirtying the deformable surface since the finger of a user can be in direct contact with each mobile element via its cap. Seals or individual protection elements of the mobile elements of which the complexity is substantial are then considered.

Another device of this type is described in the patent application published under number DE 10 2005 047 837. More precisely, this device comprises a rigid support in the form of a plate provided with circular holes arranged in an array. The mobile elements are provided to slide in the holes and as such form, with the plate, the deformable surface. The set of sensors is a network of wire conductors arranged also in an array and attached on the rigid plate between the holes, i.e. between the mobile elements. But since the mobile elements and the sensors must share the space occupied by the deformable surface, this reduces the surface of the sensors and/or of the mobile elements. This configuration further has the same risks of dirtying and of electrical interactions as the preceding one. Finally, when all of the mobile elements are in the top position in the deformable surface, it becomes difficult for the sensors to detect a touch since their fixed position on the plate, independent of that of the mobile elements, remains low thus rendering them inaccessible to the touch.

It can then be desired to provide a display device having a deformable surface and having position sensors which makes it possible to overcome at least one portion of the aforementioned problems and constraints.

An object of the invention is therefore a display device having a deformable surface comprising:
- a plurality of actuators having mobile elements that can be moved so as to deform the deformable surface, these mobile elements being distributed in the space occupied by the deformable surface, and
- a set of position sensors for sensing the position of at least one touch likewise being distributed in the space occupied by the deformable surface, further comprising an elastic flexible membrane placed against the mobile elements, extending through the space occupied by the deformable surface and able to accompany the deformation of the latter, the set of sensors being secured to the elastic flexible membrane.

As such, the flexible membrane fills a dual function:
- that of protecting the actuating portion, and therefore the deformable surface, against the risks of dirtying or deterioration, and
- that of increasing the decoupling between the actuating and the detecting of the touch by securing the sensors to the flexible membrane rather than to the actuators or to their support.

In particular, the decoupling of the actuators and of the sensors makes it possible to increase the surface of the sensors and/or of the mobile elements since their geometries become independent, which improves sensitivity and the haptic feedback of the device. This decoupling further makes it possible to provide a good detection of the touch by the sensors regardless of the position of the mobile elements of the actuators.

Optionally, the elastic flexible membrane is formed in an elastomeric material of the silicone or rubber type, or formed from an elastic fabric of the elastane or silk type.

Also optionally, the elastic flexible membrane comprises a first upper contact portion with a user wherein the position sensors are embedded, a second portion extending towards the mobile elements and comprising a plurality of tactile pixels, and a third support portion extending between the tactile pixels, with the second and third portions being made in one piece with the first portion.

Also optionally, the mobile elements and the set of sensors are distributed in a regular manner, in particular in array fashion, in the space occupied by the deformable surface.

Also optionally, the sensors are electricity conducting capacitive or resistive sensors.

Also optionally, the set of sensors is an array of conducting wires secured to the elastic flexible membrane and able to accompany its deformations, placed in such a way that the conducting wires are interposed between the mobile elements.

Also optionally, the set of sensors is an array of channels filled with a conducting fluid, in particular a conductive grease, with these channels formed in the elastic flexible membrane and able to accompany its deformations, and arranged in such a way as to cover the mobile elements at least partially.

Also optionally, the set of sensors is an array of conducting elastomer, in particular an elastomer loaded with conductive particles, with this array of conducting elastomer being formed in the elastic flexible membrane and able to accompany its deformations, and arranged in such a way as to cover the mobile elements at least partially.

Also optionally, a display device having a deformable surface according to the invention can comprise an array for locking mobile elements in at least three different functional positions:
- a first function position of unlocking wherein the mobile elements are free to move between a top position and a bottom position,
- a second functional position of locking wherein only the mobile elements in top position are maintained in top position, with the others prevented from taking this top position, and
- a third functional display position wherein the array for locking carries, from the second position of locking, the mobile elements maintained in top position against the elastic flexible membrane in order to deform it.

Also optionally, a display device having a deformable surface according to the invention can comprise a display screen comprising:

a plate, this plate being provided with a plurality of pass-through ducts wherein are inserted, free in orthogonal displacement in relation to the plate, the mobile elements of the actuators, and the elastic flexible membrane placed against the plate.

Also optionally, a display device having a deformable surface according to the invention can comprise a thin skin with a texture different from that of the elastic flexible membrane and extending over the free surface of the elastic flexible membrane.

Also optionally, a display device having a deformable surface according to the invention can comprise a lighted display system distributed in the space occupied by the deformable surface, in particular a plurality of light-emitting diodes distributed in the space occupied by the deformable surface, each diode being for example incorporated into an actuator mobile element and/or at the periphery of the deformable surface.

Such a lighted display system makes it possible to generate a visual return that improves the visibility of the display screen.

Figure 5:
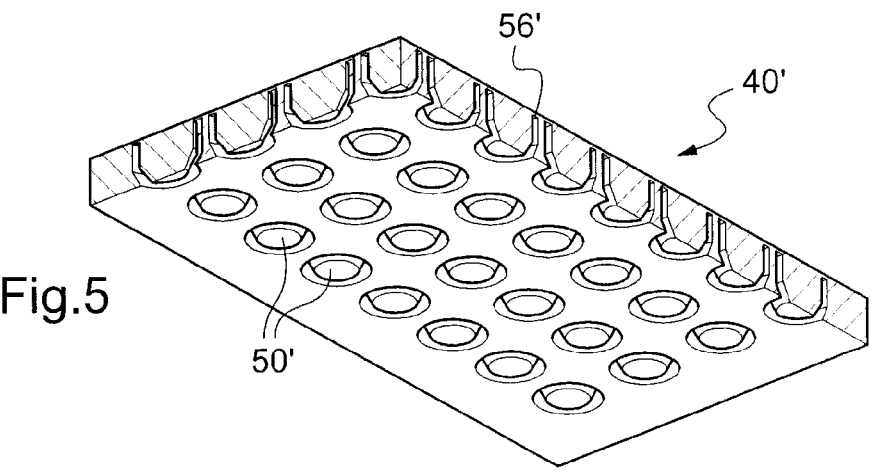
Figure 6:
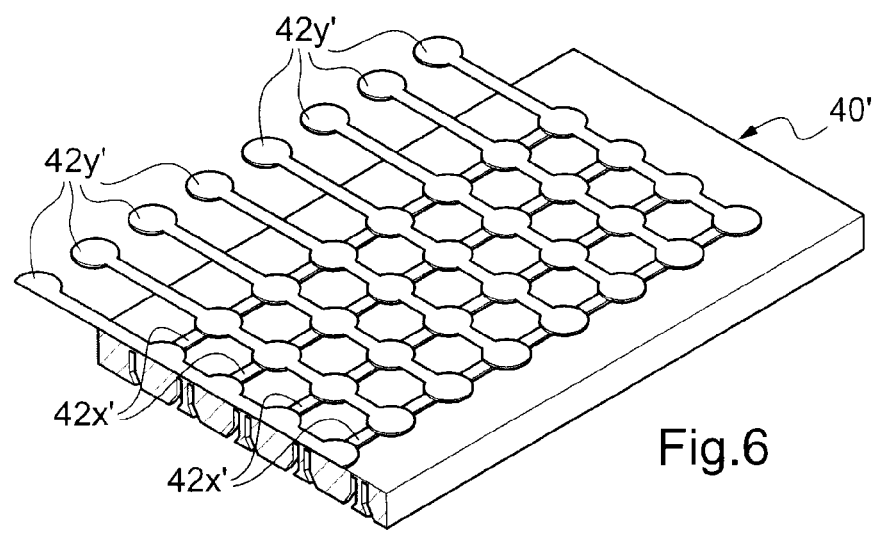

The invention shall be better understood using the following description, provided solely by way of example and made in reference to the annexed drawings wherein:

FIG. 1 schematically shows in a cross-section perspective the general structure of a display device having a deformable surface according to an embodiment of the invention, FIG. 2 schematically shows as a cross-section a detail of the display device of FIG. 1, according to a first alternative, FIG. 3 schematically shows as a cross-section a detail of the display device of FIG. 1, according to a second alternative, FIGS. 4 and 5 schematically show in perspective a detail of the display device of FIG. 1, according to a third alternative, FIG. 6 schematically shows in perspective a detail of the display device of FIG. 1, according to a fourth alternative, and FIGS. 7A, 7B, 7C and 7D schematically show in perspective different embodiments of tactile pixels of the display device of FIG. 1 according to the first alternative of FIG. 2.

A display device 10 having a deformable surface is shown in a cross-section perspective in FIG. 1. This device comprises a case 12 of any form, to be adapted according to the target application, pierced on one of its walls, for example the upper wall such as oriented in FIG. 1, by a window 14 of rectangular or square shape intended to receive a display screen having a deformable surface.

Inside the case 12, an upper frame 16, of a generally rectangular shape and pierced with cylindrical pass-through holes 18 arranged in an array on a surface corresponding to the space occupied by the window 14, is thrust against the internal surface of the upper wall of the case 12. These cylindrical holes 18 are as such distributed in a regular manner in the space occupied by the window 14.

Inside the case 12 also, a lower frame 20, of a generally rectangular shape and pierced with cylindrical holes 22, pass-through or not, arranged facing the cylindrical pass-through holes 18, is attached to lateral extensions of the upper frame 16 in a manner known per se. When the cylindrical holes 22 are pass-through, the lower frame 20 can further rest on ribs 24 extending from the bottom of the case 12 and of which a function is in particular to close these holes in the bottom of the lower frame 20.

Thanks to the lateral extensions of the upper frame 16, a volume is available between the two fames 16 and 20 in order to receive the various elements that constitute actuators having mobile elements of the display device 10.

Each of these actuators comprises for example a core 26 of a generally cylindrical shape constituted of iron, steel or a magnet, more generally of a soft or hard ferromagnetic material. Each core 26 is surmounted by a cylindrical extension 28 made of insulating material. As shown in FIG. 1, this cylindrical extension 28 can be attached to the core 26 via insertion. It can also be detached from the core 26 by being simply placed on top of it and is able to be driven in displacement in the corresponding hole 18. The set comprised of a core 26 and of its extension 28 forms the mobile element of an actuator, with this mobile element being guided in translation by the corresponding holes 18 and 22 wherein it is inserted. It is therefore displaced in a direction orthogonal to the upper wall of the case 12. As such, the upper surface with holes of the upper frame 16 occupying the space delimited by the window 14, associated to the extensions 28 of the mobile elements inserted into the holes of the upper frame 16, form the deformable surface of the display device 10. The mobile elements 26, 28 constitute the tactile pixels of this deformable surface since they can each be displaced individually between at least one top position and one bottom position.

In order to provoke the displacement of the mobile elements between their top and bottom positions, the actuators each further comprise a electromagnetic coil 30 arranged in the inside cylindrical wall of a corresponding pass-through hole formed in an intermediary frame 32 attached between the upper and lower frames 16 and 20. This intermediary frame 32 is therefore also pierced with pass-through holes arranged in an array, each coil arranged in one of its holes being controlled individually by a source of electric current (not shown) for the individual displacement of each mobile element 26, 28.

Optionally but advantageously, an array for locking 34 is provided in the case 12. It is arranged freely and is guided in lateral translation over the lower frame 20 and is pierced for example with ovoid holes 36 arranged in an array. Each mobile element 26, 28 then comprises in the lower portion of its core 26 a flange 38 intended to cooperate with the array for locking 34 in the following manner:

in a first position of unlocking of the array for locking 34, the mobile elements 26, 28 are centred on respective portions of maximum diameter of the ovoid holes 36, in particular portions of which the diameter is greater than that of the flanges 38, in such a way that the mobile elements 26, 28 are free in translation in the holes 18 and 22, in a second position of locking of the array of locking 34, the mobile elements 26, 28 are centred on respective portions of a minimum diameter of the ovoid holes 36, in particular portions of which the diameter is less than that of the flanges 38, in such a way that the mobile elements 26, 28 are maintained either in top position, or in bottom position, without being able to return from one to the other.

The array for locking 34 is further guided in vertical translation, i.e. in the direction of displacement of the mobile elements 26, 28, in order to occupy a third so-called display position starting from its second position of locking. More precisely, during the passing from its locking position to its display position, according to a principle of vertical bistability, the array for locking 34 drives all of the mobile elements in top position upwards while all of the mobile elements in bottom position remain as they are. The mobile elements in top position are then carried towards a position wherein their extensions 28 exit the pass-through holes 18 in the window 14, as such creating the sought pattern in relief.

Thanks to the array of locking 34, the pattern in relief can be maintained without any additional supply of energy and its resistance to the pressure of a touch is much greater than what it would be if only the electromagnetic actuators had to provide this maintaining in display position.

In accordance with the invention, the window 14 comprises an elastic flexible membrane 40 placed against the array of tactile pixels (i.e. the deformable elements 26, 28 and in particular the extensions 28) and extending through the space occupied by the deformable surface of this array of tactile pixels. It is able to accompany the deformation of the latter, for example by gluing or by maintaining a certain depression between this membrane 40 and the inside of the case 12. The set constituted of the deformable surface (i.e. the portion of the upper frame 16 occupying the surface of the window 14 and the upper portion of the mobile elements) and of the flexible membrane 40 forms the tactile display screen of the device 10.

Finally, the display device 10 comprises position sensors for sensing the position of at least one touch formed, in the alternative embodiment of FIG. 1, of wire electricity conductors 42x, 42y placed in an array between the pass-through holes 18. The wire electricity conductors 42x are placed in parallel in the window 14 according to a first main direction of this window in such a way as to detect the position of a touch according to a first abscissa axis. The wire electricity conductors 42y are placed in parallel in the window 14 according to a second main direction of this window, orthogonal to the first, in such a way as to detect the position of a touch according to a second ordinate axis. The detection, of which the principle is known and shall not be detailed, is carried out via measurements of capacitive or resistive variations in the electricity conductors 42x and 42y.

The sensors 42x, 42y are secured to the elastic flexible membrane 40. In practice, they can be glued under the membrane 40, i.e. against its surface in contact with the deformable surface of the display screen. They can also be embedded in the membrane 40, in particular when the latter is made of an elastomeric material of the silicone or rubber type. As such, the array of sensors 42x, 42y accompanies the deformations of the elastic flexible membrane 40 and is decoupled from the electromagnetic actuating of the mobile elements 26, 28. This decoupling is mechanical since the sensors are not directly secured to the actuators, but it is also electrical when the material used for the membrane 40 is electrically insulated and the sensors are embedded in this membrane. Moreover, the membrane 40 provides a function of protecting the deformable surface against the exterior aggressions or impacts as well as against dirtying.

Details on the upper portions of the mobile elements 26, 28, qualified as tactile pixels, in cooperation with the membrane 40 comprising the sensors 42x, 42y, shall now be provided according to two possible alternative embodiments shown in FIGS. 2 and 3.

According to the alternative shown in FIG. 2, the tactile pixels are shown independently of the actuating portion. In this alternative, they are moreover not necessarily secured to the cores 26. They van be constituted of independent pins that may simply be pushed by the cores 26 (or even by the mobile elements 26, 28 shown in FIG. 1, if they do not replace the extensions 28 but are added to them). Two tactile pixels 50A are shown in bottom position. Two other tactile pixels 50B are shown in top position. They are inserted into the pass-through holes 18 of a rigid support, in particular, as shown in FIG. 1, a rigid support constituted of the upper frame 16.

In the bottom position of the pixels, their upper surfaces 54 are flush with the upper surface of the upper frame 16, in such a way that the deformable surface is therefore flat. The elastic flexible membrane 40 placed against the array of tactile pixels and extending through the space occupied by the deformable surface is glued only to the upper surfaces 54 of the tactile pixels. An advantage of this configuration, as can be seen for the pixels 50B in top position, is that the relief displayed is continuous, i.e. without cut-outs between two neighbouring pixels 50B. On the other hand, a disadvantage of this configuration, as can be seen between two neighbouring pixels 50A and 50B, one in bottom position, the other in top position, is that via elasticity, the deformable membrane 40 tends to drive any neighbouring pixel 50A of a pixel 50B in top position.

A solution in order to overcome this disadvantage is to provide means for recalling into bottom position, for example springs (identified by the reference 52A in position of minimum compression and by the reference 52B in position of maximum compression). This solution adds complexity. Moreover, the stiffness of the springs must be sufficiently high in order to counter the action of the elastic flexible membrane 40 but also sufficiently low in order to not increase the force to be exerted in order to bring a tactile pixel in top position. Concretely, for an elastomeric membrane 40 of a thickness of 220 μm and tactile pixels of about 4 mm in diameter spaced 1 mm apart, the action of the membrane on the tactile pixels in bottom position neighbouring pixels in top position can be approximately 2 Newtons. The springs must therefore exert a recalling force that exceeds, for example 3 Newtons, in order to limit to about 4 Newtons, which is already high, the force required to bring the pixels 50B in top position.

Optionally, a display device having a deformable surface according to the invention can comprise a lighted display system distributed in the space occupied by the deformable surface in the window 14 in order to generate a visual feedback that improves the visibility of the display screen. In particular, as shown in FIG. 2, light-emitting diodes 55 can be distributed in the space occupied by the deformable surface, each diode 55 being for example incorporated into a pixel 50A, 50B in the vicinity of its upper surface 54. Alternatively, each diode 55 can be incorporated into the upper frame 16 between the pixels. Alternatively also, or as a complement, diodes 55 can be arranged on the periphery of the deformable surface, for example in the inside edges of the window 14 in the vicinity of the ends of the wire electricity conductors 42x, 42y.

According to the alternative shown in FIG. 3, the tactile pixels are also shown independently of the actuating portion. In this alternative, they are furthermore no longer necessarily secured to the cores 26. They can be constituted of independent pins that may simply be pushed by the cores 26 (or by the mobile elements 26, 28 shown in FIG. 1). Two tactile pixels 50A are shown in bottom position. Two other tactile pixels 50B are shown in top position. They are inserted in non-pass-through cavities 18' of a flexible support 16' different from the upper frame 16. According to the application, the flexible support 16' can replace the upper frame 16 or it can be arranged and glued on top of the latter.

In this alternative, the elastic flexible membrane 40 placed against the array of tactile pixels and extending through the space occupied by the deformable surface is glued over its entire internal surface to the flexible support 16' of which the upper surface is flat when all of the tactile pixels are in bottom position. The upper surfaces 54 of the tactile pixels are not in direct contact with the membrane 40 but are separated from the latter by zones 56 of lesser thickness of the flexible support 16' located in the bottom of the cavities 18'. An advantage of this configuration, as can be seen between two neighbouring pixels 50A and 50B, one in bottom position, the other in top position, is that the membrane 40 does not exert any driving on that of the two neighbouring pixels which is in bottom position. Its elasticity even tends to maintain by default each pixel in bottom position. It is therefore not required to provide means for recalling in bottom position: this alternative is simple to design, it can in particular be manufactured by an industrial process of the rotary printing type at low cost. Another advantage of this configuration is that no stress is exerted on the sensors 42x, 42y regardless of the relief displayed. However, a disadvantage of this configuration, as can be seen between two neighbouring pixels 50B in top position, is that cut-outs appear between these pixels, with the relief displayed then being discontinuous.

FIG. 4 shows a third alternative embodiment, for which only the elastic flexible membrane is shown in perspective view mainly from above. Indeed, according to this alternative, the flexible membrane, referenced here as 40', incorporates the tactile pixels and the flexible support of the preceding alternative. In other terms, the elastic flexible membrane, the tactile pixels and the flexible support are formed by moulding in a single elastic flexible material, for example an elastomer of the silicone or rubber type, in order to form an interface 40' wherein are also embedded the sensors 42x, 42y in the vicinity of its external surface of contact with a user of the display device 10.

FIG. 5 shows the elastic flexible membrane 40' in perspective viewed mainly from below. From this angle, the tactile pixels 50' are clearly visible. They are for example directly displaced vertically by the cores 26 (not shown) or by the mobile elements 26, 28 shown in FIG. 1. The zones of lesser thickness 56' formed in the bottom of the cavities wherein they are located indeed allow for the displacement of the tactile pixels 50' without however deforming the support portion which however is moulded in the same material.

Of course, intermediate alternative embodiments, between the alternative shown in FIG. 3 and that illustrated in FIGS. 4 and 5 can be considered: in particular alternatives according to which the flexible support and flexible membrane portions with incorporated sensors are moulded in the same material, but not the tactile pixels; alternatives according to which the flexible support and tactile pixel portions are moulded in the same material, but not the flexible membrane; or alternatives according to which the flexible membrane and tactile pixel portions are moulded in the same material, but not the support.

Furthermore, in the same flexible material, portions can be stiffened by a specific treatment (for example the support portion or the pixels). Likewise, portions can be treated, in particular the upper zone of the membrane portion, in order to render more pleasant the interaction between the interactive display device 10 and a user: this treatment can be carried out by physical-chemical depositions of flush particles. Alternatively, an additional surface layer, in other terms a thin "skin", of a texture different from that of the elastic flexible membrane, can be added on top of the latter in order to improve the man-machine interaction. This skin can be made from an elastic plastic material or from an elastic fabric known to be pleasant to the touch.

FIG. 6 shows a fourth alternative embodiment, for which only the elastic flexible membrane is shown in perspective view mainly from above. This alternative differs from the preceding one by the wire sensors 42x and 42y which are replaced with sensors 42x' and 42y' made of flexible conducting material filling the channels arranged in the elastic flexible membrane 40'. This flexible material is for example a conductive grease, i.e. a grease that includes conductive metal particles such as silver or copper.

In practice, the upper portion of the elastic flexible membrane 40', which comprises these conducting channels can be manufactured according to a multilayer design by gluing or overmoulding, on a flexible membrane already comprising for example the tactile pixels and/or the flexible support, with the following elements designed in the same elastic and flexible material:
- a first thin layer pierced with channels extending along the abscissa axis above each row of tactile pixels, with the channels widening locally above each tactile pixel in order to cover the upper contact surface thereof,
- a second solid thin layer covering all of the channels of the first layer,
- a third thin layer pierced with channels extending along the ordinate axis above each column of tactile pixels, with the channels widening locally above each tactile pixel in order to cover the upper contact surface thereof, and
- a fourth solid thin layer covering all of the channels of the third layer.

The channels of the first and third layers are filled with a conductive grease as such forming the array of conductors 42x' and 42y' such as shown in FIG. 6: the two networks of conductors in abscissa and in ordinates are superposed above the tactile pixels, where they have enlargements, but remain isolated from each other thanks to the second layer.

Note that the fourth alternative, consisting in replacing wire conductors with flexible channels with conductive grease, was presented as a derivative of the third alternative, but it is clear that it can also be derived from the other alternatives of embodiments that can be considered, in particular those described previously.

According to another alternative not shown, the set of sensors 42x' and 42y' is an array of conductive elastomer, in particular an elastomer loaded with conductive particles, with this array of conductive elastomer also formed in the elastic flexible membrane 40' and able to accompany its deformations. As previously, it can be arranged in such a way as to cover at least partially the tactile pixels, or more generally the mobile elements.

Finally, FIGS. 7A, 7B, 7C and 7D schematically show in perspective various embodiments of tactile pixels of the display device of FIG. 1 in accordance with the first alternative of FIG. 2. But here again, these various embodiments can easily be adapted to the other alternative embodiments that can be considered.

Figure 7A:
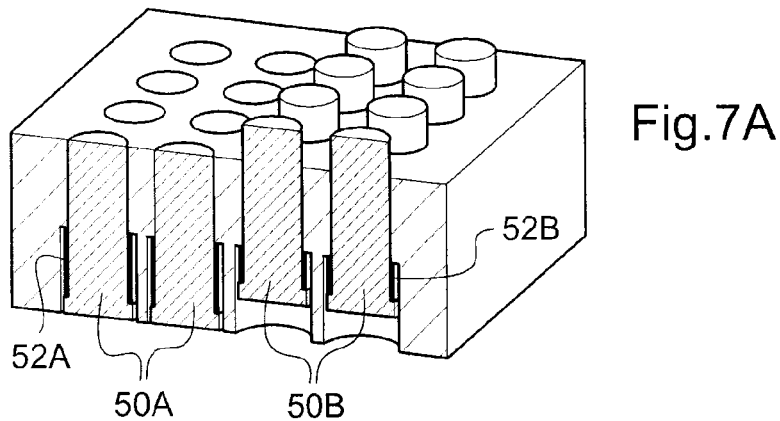

According to a first embodiment shown in FIG. 7A, the simplest to carry out from a technical standpoint and in accordance with what is shown in FIG. 2, the upper portion of the tactile pixels 50A, 50B is cylindrical and has a diameter slightly less than the inner diameter of the springs 52A, 52B.

Figure 7B:
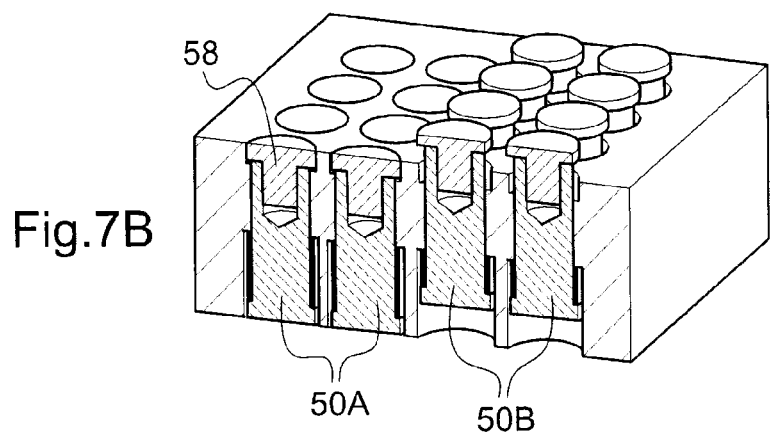
Figure 7C:
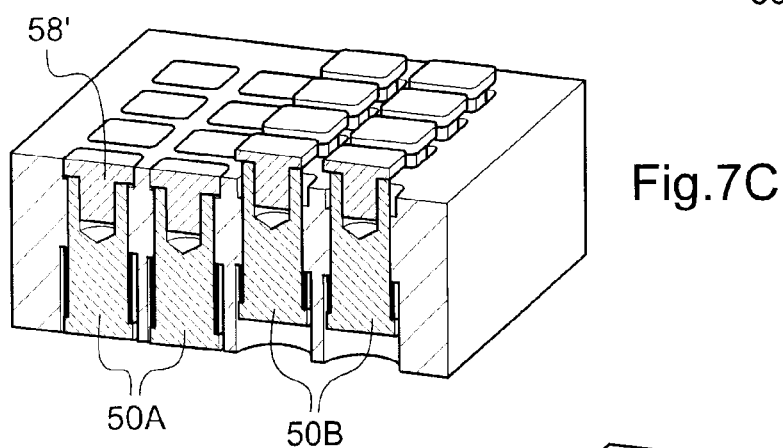
Figure 7D:
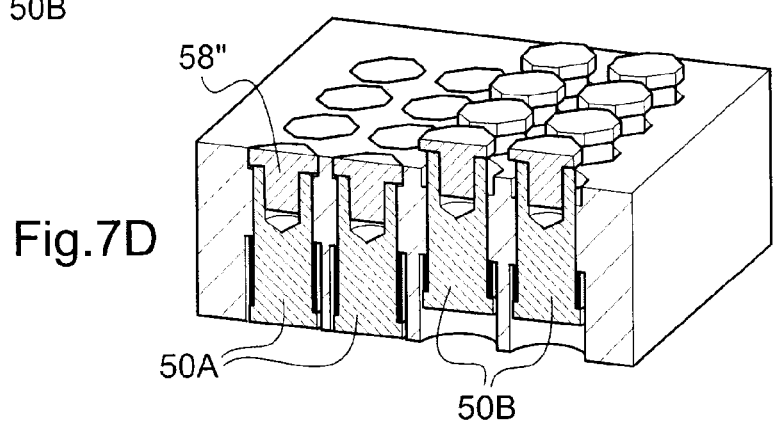

Contrary to this first embodiment, according to the embodiments shown in FIGS. 7B, 7C and 7D, the upper portion of each tactile pixel 50A, 50B has an insert in such a way as to optimise its contact surface 54.

In FIG. 7B, the insert 58 is circular, but of a diameter greater than the inside diameter of the springs 52A, 52B. This solution is the best for displaying irregular geometric shapes such as complex, rounded and dissymmetrical patterns.

In FIG. 7C, the insert 58' is rectangular, or even square. This solution is the best for displaying regular geometrical shapes such as straight lines and rectangles of which the main directions correspond to the abscissa and ordinate axes of the tactile pixels.

In FIG. 7D, the insert 58" is octagonal. This solution can be considered as a good compromise between the circular and rectangular shapes for displaying straight lines and rectangles such as mentioned hereinbefore but also diagonals or circular patterns.

It clearly appears that a tactile and interactive display device such as that described previously according to its various alternatives makes it possible to protect the actuating portion and to increase the decoupling between the actuating and the detecting of touch by securing the sensors to a protective elastic flexible membrane rather than to the actuators or to their support. In particular, the decoupling of the actuators and of the sensors makes it possible to increase the surface of the sensors and/or of the mobile elements since their geometries become independent, which improves the sensitivity and the haptic feedback of the display device.

Furthermore, the robustness of this device, improved thanks to the protection of the deformable surface by the elastic flexible membrane, and its cost of manufacture, even lower as the embodiment wherein the support, tactile pixels and protective membrane portions including the sensors can be manufactured in a single monolithic part, make it possible to consider applications in the automobile sector where manufacturing is carried out on a large scale. The particular interest of this type of display device in an automobile is that it makes it possible to simply access driving or comfort functions without visually distracting the attention of the driver.

Note moreover that the invention is not limited to the embodiments described previously. It shall appear indeed to those skilled in the art that various modifications can be made to the embodiments described hereinabove, using the teachings which have just been disclosed. In the following claims, the terms used must not be interpreted as limiting the claims to the embodiments exposed in this description, but must be interpreted in order to include therein all of the equivalents that the claims aim to cover due to their formulation and of which the determination is within reach of those skilled in the art by applying their general knowledge in implementing the teachings which have just been disclosed.

The invention claimed is:

1. A display device including a deformable surface, comprising:
    a plurality of actuators including mobile elements that are moveable to deform the deformable surface, the mobile elements being distributed in a space occupied by the deformable surface, the mobile elements including an conductive or magnetic portion and an insulating portion in contact with the conductive or magnetic portion;
    a set of position sensors that sense a position of at least one touch, and that are distributed in the space occupied by the deformable surface;
    an elastic flexible membrane placed against the insulating portions of the mobile elements and extending through the space occupied by the deformable surface, the elastic flexible membrane being configured to accompany deformation of the deformable surface,
    wherein the set of sensors is secured to the elastic flexible membrane and regularly distributed in the space occupied by the deformable surface in an array of electricity conductors configured to accompany deformations of the elastic flexible membrane, and
    the conductive or magnetic portion and the insulating portion remain at a same position relative to each other during movement of the mobile elements.

2. A display device including a deformable surface according to claim 1, wherein the elastic flexible membrane is formed in an elastomeric material of silicone or rubber type, or formed of an elastic fabric of elastane or silk type.

3. A display device including a deformable surface according to claim 1, wherein the elastic flexible membrane includes a first upper contact portion with a user wherein the position sensors are embedded, a second portion extending towards the mobile elements and including a plurality of tactile pixels, and a third support portion extending between the tactile pixels, the second and third portions being made in one piece with the first portion.

4. A display device including a deformable surface according to claim 1, wherein the mobile elements are regularly distributed in an array in the space occupied by the deformable surface.

5. A display device including a deformable surface according to claim 1, wherein the sensors are electricity conducting capacitive or resistive sensors.

6. A display device including a deformable surface according to claim 1, wherein the set of sensors is an array of conducting wires secured to the elastic flexible membrane, the conducting wires being interposed between the mobile elements.

7. A display device including a deformable surface according to claim 2, wherein the set of sensors is an array of channels filled with a conducting fluid, or with a conductive grease, the channels being formed in the elastic flexible membrane and arranged to cover at least partially the mobile elements.

8. A display device including a deformable surface according to claim 2, wherein the set of sensors is an array of conducting elastomer, or an elastomer loaded with conductive particles, with the array of conducting elastomer being formed in the elastic flexible membrane and arranged to cover the mobile elements at least partially.

9. A display device including a deformable surface according to claim 2, further comprising an array for locking the mobile elements in at least three different functional positions of:
    a first functional unlocking position wherein the mobile elements are free to move between a top position and a bottom position,
    a second functional locking position wherein only the mobile elements in the top position are maintained in the top position, with the other mobile elements prevented from taking the top position, and
    a third functional display position wherein the array for locking carries, from the second position of locking, the mobile elements maintained in the top position against the elastic flexible membrane to deform the elastic flexible membrane.

10. A display device including a deformable surface according to claim 2, further comprising a display screen including:
    a plate including a plurality of pass-through ducts wherein are inserted, free in orthogonal displacement in relation to the plate, the mobile elements of the actuators, and
    the elastic flexible membrane placed against the plate.

11. A display device including a deformable surface according to claim 2, further comprising a thin skin with texture different from that of the elastic flexible membrane and extending over a free surface of the elastic flexible membrane.

12. A display device including a deformable surface according to claim 2, further comprising a lighted display system distributed in the space occupied by the deformable surface, or a plurality of light-emitting diodes distributed in the space occupied by the deformable surface, each diode being incorporated into an actuator mobile element and/or on a periphery of the deformable surface.

* * * * *